(12) United States Patent
Dines et al.

(10) Patent No.: US 8,826,505 B2
(45) Date of Patent: Sep. 9, 2014

(54) METHOD AND APPARATUS FOR FACILITATING THE INSTALLATION OF A GARBAGE DISPOSAL UNIT

(71) Applicants: Steven Dines, Menlo Park, CA (US); John Martin, Santa Clara, CA (US)

(72) Inventors: Steven Dines, Menlo Park, CA (US); John Martin, Santa Clara, CA (US)

( * ) Notice: Subject to any disclaimer, the term of this patent is extended or adjusted under 35 U.S.C. 154(b) by 0 days.

(21) Appl. No.: 13/798,077

(22) Filed: Mar. 13, 2013

(65) Prior Publication Data

US 2014/0110557 A1  Apr. 24, 2014

Related U.S. Application Data

(60) Provisional application No. 61/795,578, filed on Oct. 19, 2012, provisional application No. 61/733,765, filed on Dec. 5, 2012.

(51) Int. Cl.
| | |
|---|---|
| *B23P 11/00* | (2006.01) |
| *E03C 1/00* | (2006.01) |
| *F16M 13/02* | (2006.01) |
| *B25J 15/00* | (2006.01) |

(52) U.S. Cl.
CPC ............... *F16M 13/02* (2013.01); *E03C 1/00* (2013.01); *B25J 15/00* (2013.01)
USPC .................................. 29/244; 29/255; 29/270

(58) Field of Classification Search
CPC ........ B23P 11/00; B23P 11/005; B23P 19/00; B23P 19/007; B23P 19/04; B23P 19/046
USPC ........... 29/244, 255, 270, 278, 271, 238, 239
See application file for complete search history.

(56) References Cited

U.S. PATENT DOCUMENTS

| | | | |
|---|---|---|---|
| 5,177,853 A | 1/1993 | Herook | |
| 5,685,209 A | 11/1997 | Fiedler | |
| 6,141,862 A * | 11/2000 | Matsui et al. | .......... 29/714 |
| 6,557,229 B1 | 5/2003 | Ricci | |
| 6,609,283 B1 | 8/2003 | Somerville | |
| 7,185,408 B1 | 3/2007 | Keith | |

(Continued)

FOREIGN PATENT DOCUMENTS

KR      20100094044 A      8/2010

OTHER PUBLICATIONS

International Search Report and Written Opinion dated Jan. 9, 2014 for PCT Patent Application No. PCT/US2013/064777.

(Continued)

*Primary Examiner* — Lee D Wilson
(74) *Attorney, Agent, or Firm* — The Mueller Law Office, P.C.

(57) ABSTRACT

Disclosed herein is an apparatus for assisting with the installation or removal of a garbage disposal unit. The apparatus comprises a rod, a mechanism coupled to the rod, a plate which is moveably coupled to the rod, and multiple wedges. The wedges are pivotally coupled to the plate. Upon engaging the mechanism, the wedges move from a contracted first position to an expanded second position. When the wedges are in the expanded second position, the wedges are capable of engaging with the inside side walls of a garbage disposal unit to transfer a weight of the garbage disposal unit onto the mechanism and the rod.

18 Claims, 10 Drawing Sheets

(56) References Cited

U.S. PATENT DOCUMENTS

| | | |
|---|---|---|
| 7,458,141 B2 | 12/2008 | Goldburt et al. |
| 7,726,631 B2 | 6/2010 | Noe et al. |
| 7,770,277 B2 * | 8/2010 | Wridt .............................. 29/261 |
| 8,079,123 B2 * | 12/2011 | Lin ................................. 29/259 |
| 8,656,569 B2 * | 2/2014 | Klann ............................. 29/263 |
| 2007/0000116 A1 | 1/2007 | Goldburt et al. |
| 2012/0124724 A1 | 5/2012 | Lapointe |

OTHER PUBLICATIONS

Disposal Install Aider, Accessed on Nov. 4, 2012, disposalinstallaider.com.

* cited by examiner

METHOD AND APPARATUS FOR FACILITATING THE INSTALLATION OF A GARBAGE DISPOSAL UNIT

CROSS REFERENCE TO RELATED APPLICATIONS

This patent application claims priority from U.S. Provisional Patent Application No. 61/795,578 filed on Oct. 19, 2012, and U.S. Provisional Patent Application No. 61/733,765 filed on Dec. 5, 2012, both of which are incorporated by reference.

BACKGROUND

Under sink mounted electrical garbage disposal units continue to be installed in over half of the households in the United States. These are new installations or as these units wear out or fail, they are replacement installations. Typically a single person, either a Do-It-Yourself (DIY) homeowner or a plumber, performs the installation or replacement.

A single user can perform most of the installation or replacement operations. However, a critical part of this operation is holding the new or existing garbage disposal unit in the correct and precise position underneath the sink, while the garbage disposal unit is securely attached to the sink or detached from the sink. A typical garbage disposal unit can weigh approximately 7 kg (15 lb) making the operation difficult for one person.

SUMMARY

Disclosed herein is an apparatus for assisting with the installation or removal of a garbage disposal unit. The apparatus comprises a rod, a mechanism coupled to the rod, a plate which is moveably coupled to the rod, and multiple wedges. The wedges are pivotally coupled to the plate. Upon engaging the mechanism, the wedges move from a contracted first position to an expanded second position. When the wedges are in the expanded second position, the wedges are capable of engaging with the inside side walls of a garbage disposal unit to transfer a weight of the garbage disposal unit onto the mechanism and the rod.

The present invention is better understood upon consideration of the detailed description below in conjunction with the accompanying drawings and claims.

DETAILED DESCRIPTION

The present invention provides an apparatus for assisting with the installation or removal of a garbage disposal unit. The apparatus comprises a rod, a mechanism coupled to the rod, a plate which is moveably coupled to the rod, and multiple wedges. The wedges are pivotally coupled to the plate. Upon engaging the mechanism, the wedges move from a contracted first position to an expanded second position. When the wedges are in the expanded second position, the wedges are capable of engaging with the inside side walls of a garbage disposal unit to transfer a weight of the garbage disposal unit onto the mechanism and the rod.

The rod is positioned vertically and the plate moves vertically along the rod. Tension in the rod causes the mechanism to engage with the wedges and in turn the wedges are made to engage with inside walls of a garbage disposer. Continued tension on the rod causes the mechanism to hold the wedges in place in the expanded second position. The mechanism is integral with the rod. The wedges may be conically shaped while the mechanism is curved and may be oval or a hemispherical ball. The rod and mechanism are made of a plastic material. The rod may have notches to assist in the application of a locking device that supports the apparatus within a sink.

A method for assisting with the installation or removal of a garbage disposal unit is also disclosed comprising inserting an apparatus in a contracted first position through a drain flange in a sink, the apparatus including a rod, a retaining block, a collar, a plate, multiple wedges and a mechanism. Securing the retaining block onto the rod by means of the collar. Engaging the mechanism where the mechanism is coupled to the rod. Moving the wedges from the contracted first position to an expanded second position where the wedges are pivotally coupled to the plate. Engaging the wedges with inside side walls of the garbage disposal unit and holding the wedges in the expanded second position by means of the plate where the plate is moveably coupled to the rod. The weight of the garbage disposal unit is transferred onto the mechanism and the rod when the wedges are in the expanded second position. The apparatus may be inserted from an underside of the sink or from the top of the sink.

The present invention may be used to install or remove an under sink mounted garbage disposal unit. For an installation of a garbage disposal unit, the apparatus is inserted into an uninstalled garbage disposal unit and aids in bearing the weight of the garbage disposal unit while assisting in retaining the garbage disposal unit in a desired position underneath the sink while the garbage disposer is secured to the sink. In addition, this automatically achieves the necessary alignment between the sink drain flange and the garbage disposal unit and facilitates the securing of the engaging or locking ring with the sink drain flange.

For a removal of a garbage disposal unit, the apparatus is inserted into an installed garbage disposal unit and aids in bearing the weight of the garbage disposal unit during the removal of the engaging or locking ring with the sink drain flange.

Figure 1:
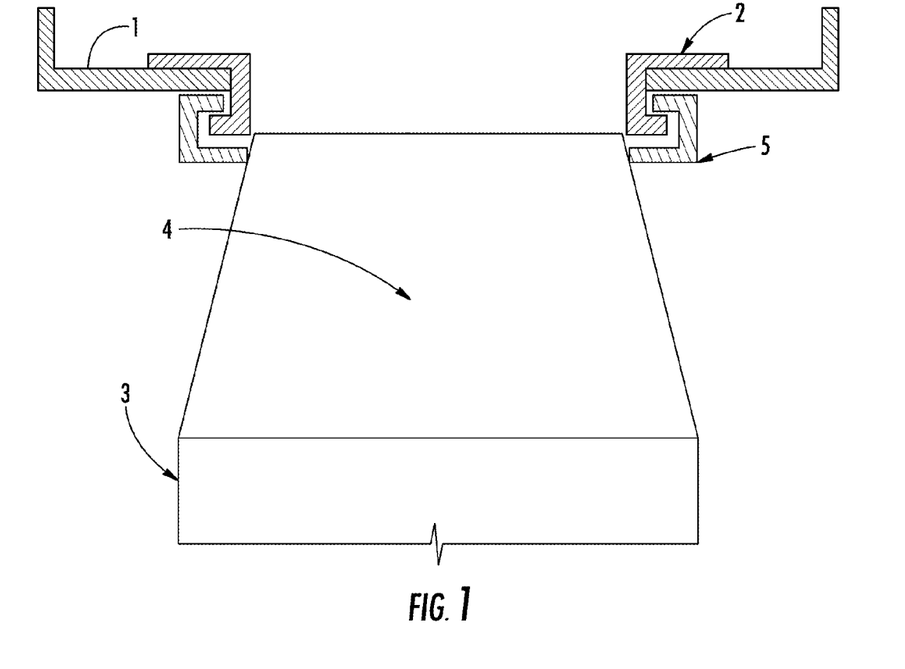
FIG. 1 is a garbage disposal unit installed underneath a sink.

FIG. 1 is the garbage disposal unit installed underneath a sink. It is typically installed by attaching the unit to the underside of a sink 1 by attaching it to a sink drain flange 2 located in a drain hole of the sink. Garbage disposal unit 3 is positioned so that a garbage disposal grinding chamber 4 is aligned with, and directly underneath, sink drain flange 2. A locking ring 5 is attached to garbage disposal unit 3, and by rotating locking ring 5 when garbage disposal unit 3 is aligned correctly, locking ring 5 becomes engaged with the sink drain flange 2. As a result, garbage disposal unit 3 becomes attached to the underside of the sink.

Figure 2:
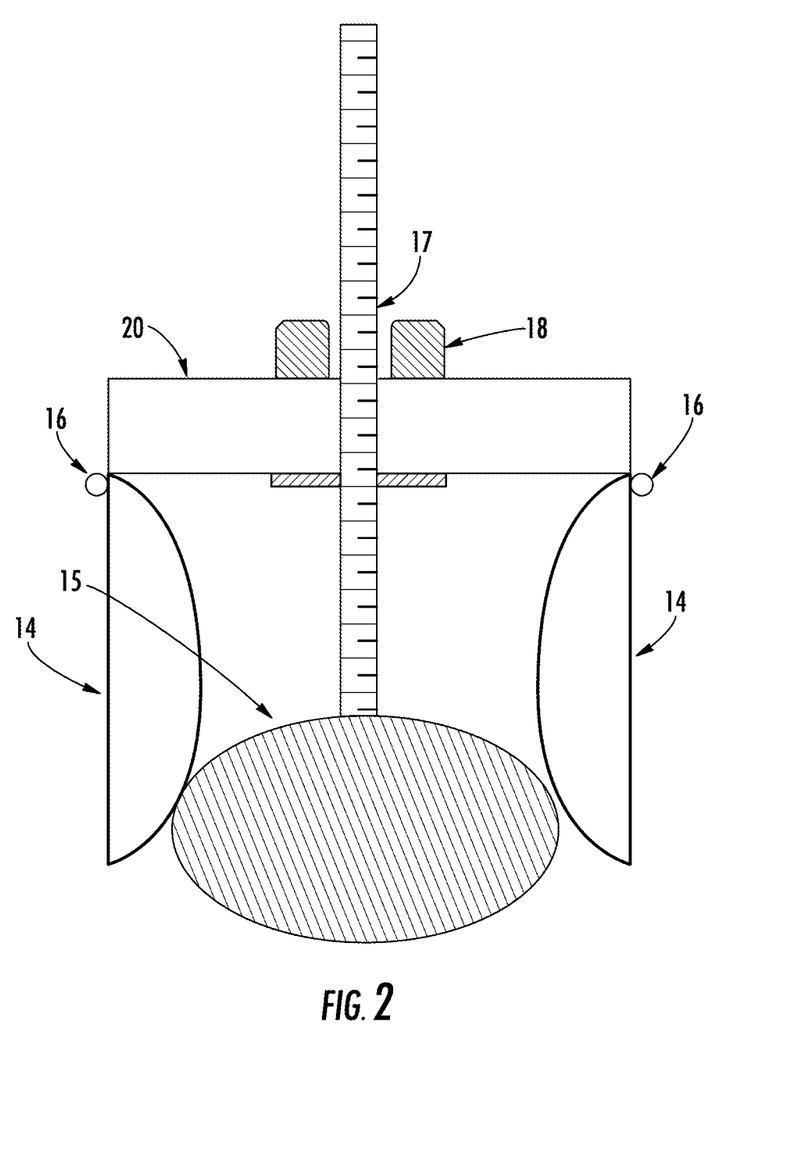
FIG. 2 shows an example embodiment of the apparatus.

FIG. 2 shows an embodiment of the apparatus for assisting with the installation or removal of a garbage disposal unit. The apparatus comprises a rod, a mechanism coupled to the rod, a plate which is moveably coupled to the rod, and multiple wedges. The wedges are pivotally coupled to the plate. Upon engaging the mechanism, the wedges move from a contracted first position to an expanded second position. When the wedges are in the expanded second position, the wedges are capable of engaging with the inside side walls of a garbage disposal unit to transfer a weight of the garbage disposal unit onto the mechanism and the rod. The mechanism holds the wedges in place in the expanded second position.

The apparatus assists with the installation or removal of a garbage disposal unit. The apparatus in a contracted first position is inserted into the garbage disposer. If the disposer is being removed, the apparatus is inserted through a drain flange in a sink. If the garbage disposer is being installed, the insertion may be done directly into the garbage disposer. The apparatus includes a rod, a retaining block, a collar, a plate, a grip, multiple wedges and a mechanism. In one embodiment, the retaining block slides onto the rod through a slot in the retaining block then a collar mechanical coupled to rod is pushed vertically downwards to secure the apparatus. In another embodiment, the retaining block slides onto the rod through a slot in the retaining block then a nut mechanical coupled to rod is engaged to secure the apparatus.

The mechanism is engaged by pulling vertically on the rod. After the mechanism coupled to the rod is engaged, the wedges are moved from the contracted first position to an expanded second position. The wedges are pivotally coupled to the plate to facilitate moving between these two positions. The wedges are then engaged with inside side walls of the garbage disposal unit and held by tension in the rod in the expanded second position with the plate. The plate is moveably coupled to the rod to facilitate this positioning. The weight of the garbage disposal unit is transferred onto the mechanism and the rod when the wedges are in the expanded second position.

The rod may be smooth, threaded or notched. When the rod is smooth, in one embodiment, a spring loaded metal plate may be used to secure the apparatus. When the rod is threaded, in one embodiment, a nut may be used to secure the apparatus. When the rod is notched, in one embodiment, a ratcheting device may be used to secure the apparatus.

The mechanism may be coupled to the rod, temporarily or permanently, and constructed of a metal, plastic or composite material. The mechanism may be curved such as an oval, hemispherical ball or dome or may be of another shape such as a triangle, rectangle, square, octagon or the like. The plate may be moveably coupled to the rod and may be circular, triangular, rectangular, square, octagonal or the like, and constructed of a metal, plastic or composite material. The grip may be permanently fastened to the plate or in another embodiment, be one component. This also may be constructed of a metal, plastic or composite material.

Multiple wedges may be pivotally coupled to the plate via hinges. The hinges may be provided with welding, soldering, a living hinge, or fasteners such as screws, nuts and bolts. The shape of the wedges may be curved, conically shaped or flat. In one embodiment, the plate, grip and wedges may be one molded, integral component.

To secure the apparatus, a retaining block and fastener may be used. The retaining block may have a slot thus may be installed and uninstalled on the rod. The fastener may be a nut, a screw collar or a push collar. In one embodiment, the retaining block slides onto the rod through a slot in the retaining block then a push collar mechanical coupled to rod slides vertically downwards to secure the apparatus. In another embodiment, the retaining block slides onto the rod through a slot in the retaining block then a nut coupled to the rod is engaged to secure the apparatus. When the rod has notches, the push collar is engaged to secure the apparatus. In this example embodiment, a rod 17 on the apparatus is notched. A mechanism 15 is coupled to rod 17 and may be integral with rod 17. Mechanism 15 is curved such as an oval or hemispherical ball. A plate 20 is moveably coupled to rod 17 and is circular. Multiple wedges 14 are pivotally coupled to plate 20 via hinges 16. Wedges 14 are curved or conically shaped.

Rod 17 is positioned vertically. Mechanism 15 is engaged by pulling rod 17 in an upward direction, thus wedges 14 move from a contracted first position to an expanded second position. When wedges 14 are in the expanded second position, wedges 14 are capable of engaging with the inside side walls of a garbage disposal unit to transfer the weight of the garbage disposal unit onto mechanism 15 and rod 17. Wedges 14 are held in place in the expanded second position by tension.

Figure 3:
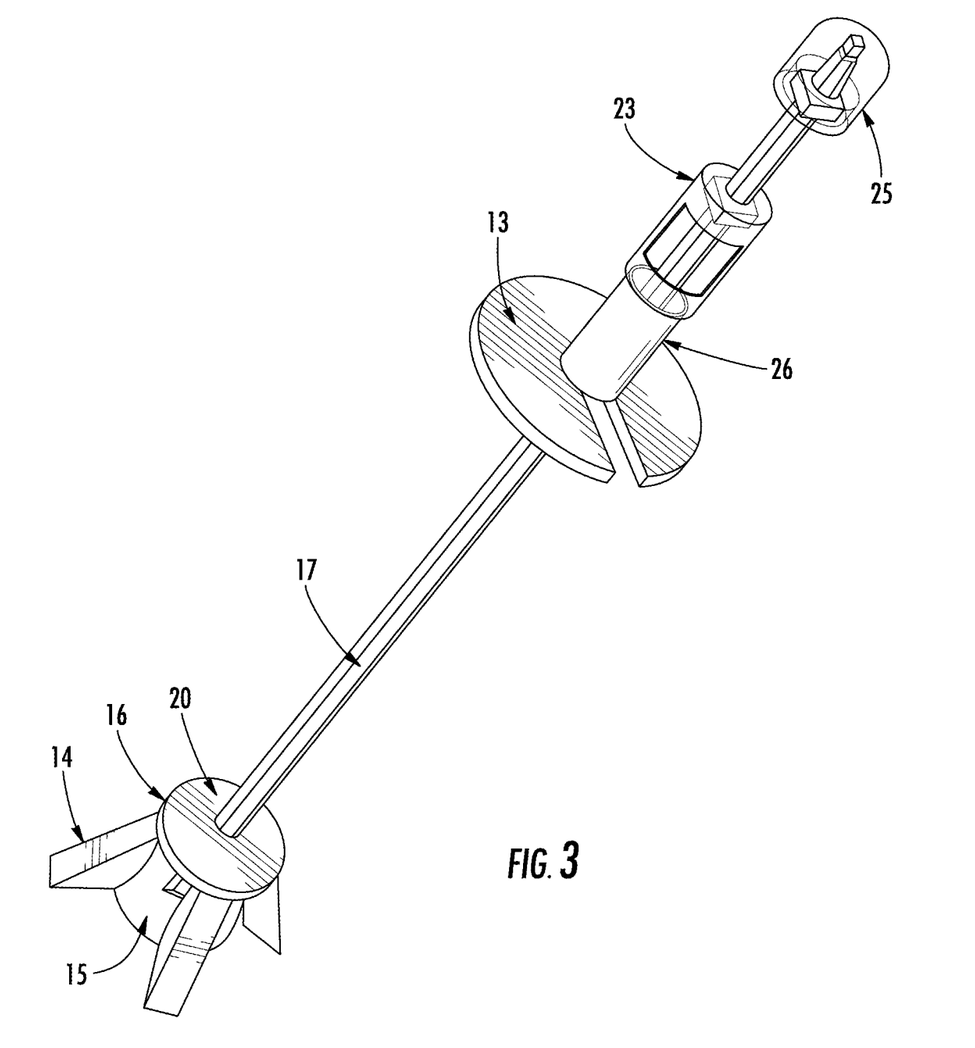
FIG. 3 illustrates an embodiment of the apparatus in a perspective view.

FIG. 3 illustrates an embodiment of the apparatus in a perspective view. A handle 25 may be used to maneuver the apparatus. Knob 25 may be permanently or temporarily attached to rod 17. In another embodiment, knob 25 may be a simple loop of material such as a tie strap or wire.

Figure 4:
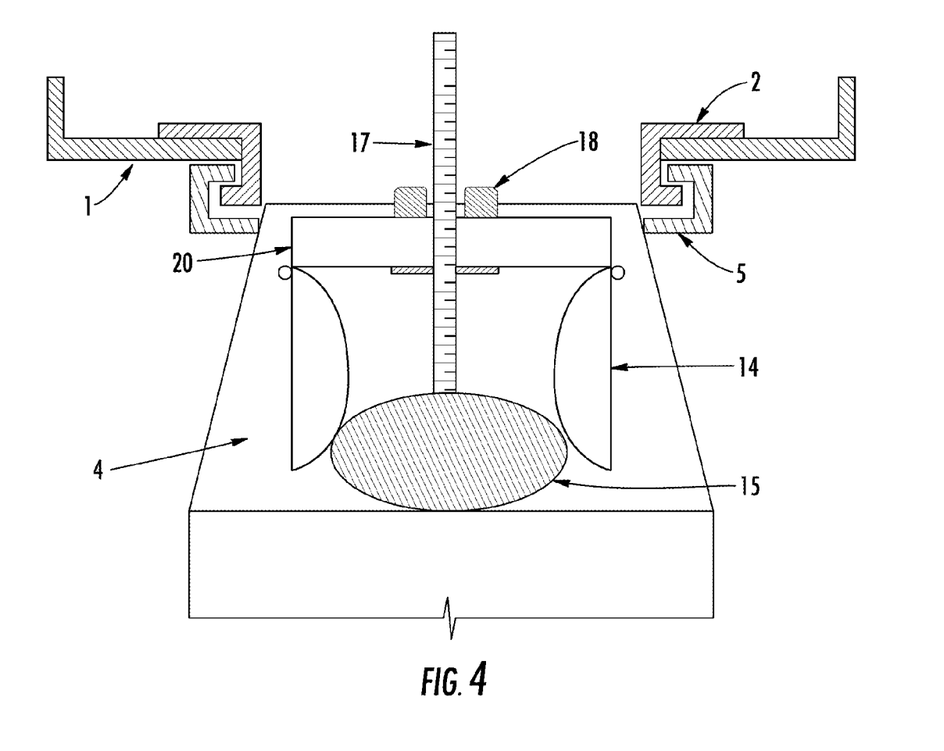
FIG. 4 details the apparatus inserted into the garbage disposal grinding chamber with the wedges in the contracted, first position.
Figure 5:
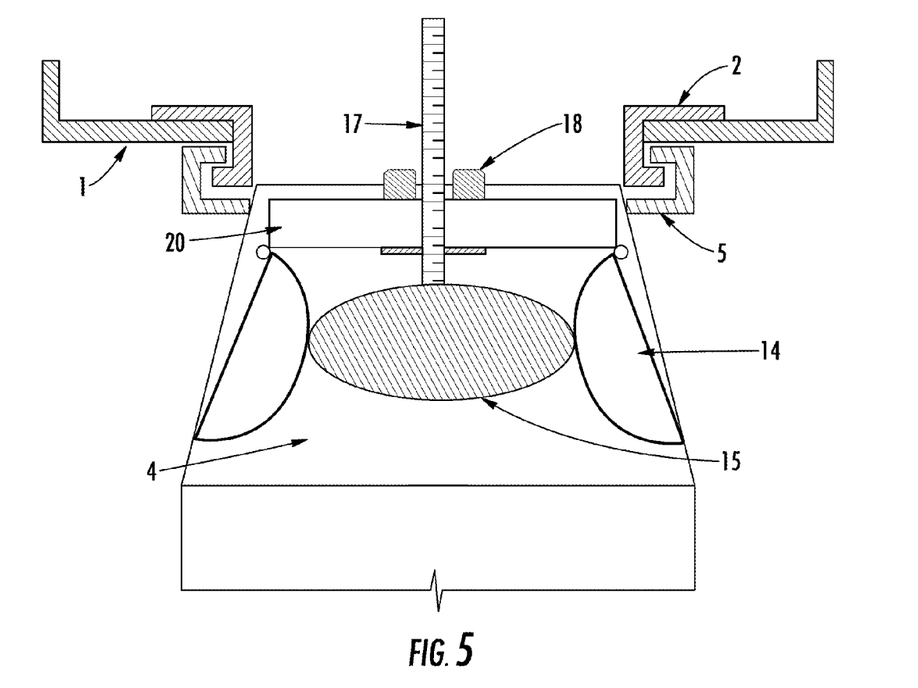
FIG. 5 shows the apparatus inserted into the garbage disposal grinding chamber with the wedges in the expanded, second position.

FIG. 4 details the apparatus inserted into the garbage disposal grinding chamber 4 with wedges 14 in the contracted, first position. FIG. 5 shows the apparatus during installation of a garbage disposer, inserted into the garbage disposal grinding chamber 4 with wedges 14 in the expanded, second position. Tension in rod 17 causes the engagement of mechanism 15 which causes wedges 14 to extend and lodge against the sides of the garbage disposal grinding chamber.

Figure 6:
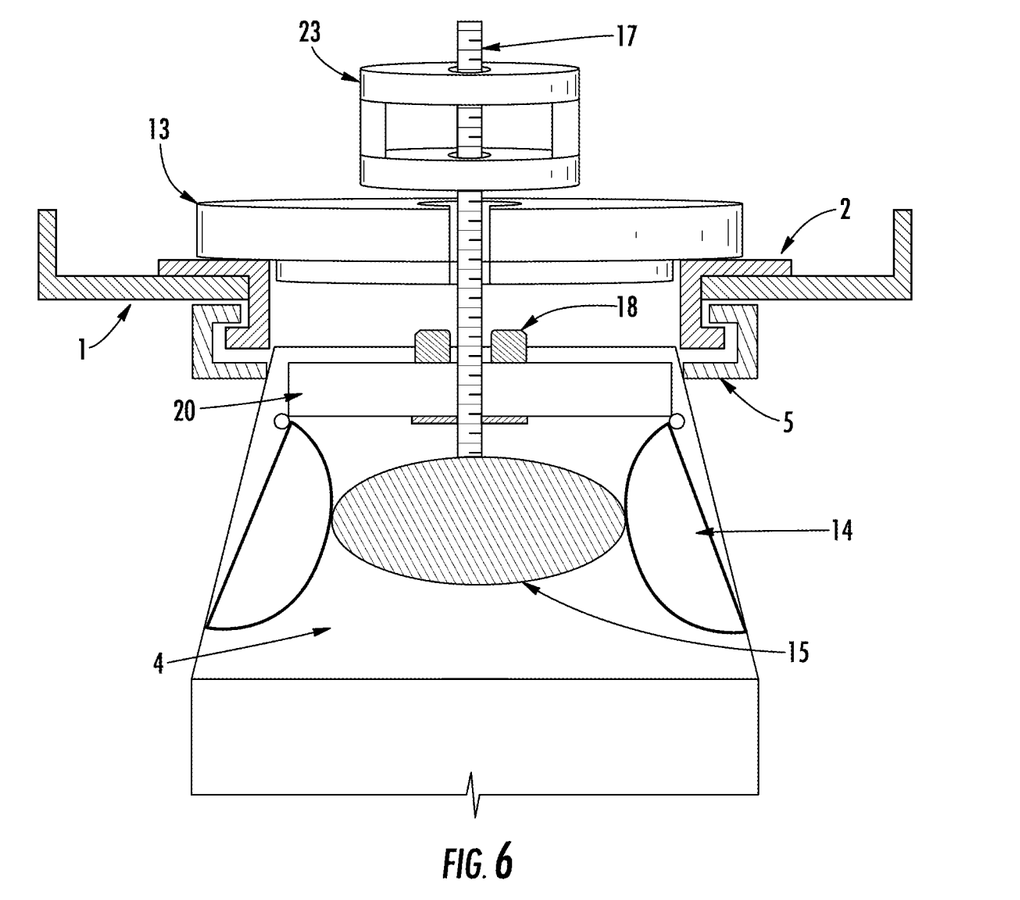
FIG. 6 is the apparatus installed in the garbage disposal suspended from the sink.

Now that the apparatus is engaged in the garbage disposal unit bearing the weight of the garbage disposal unit, rod 17 can then be inserted from the underside of the sink through the sink drain flange, and the entire unit can be suspended from the sink. The apparatus is then secured. In one embodiment, a retaining block 13 and a screw collar or push collar 23 are fastened on rod 17 as shown in FIG. 6. Retaining block 13 slides onto the rod through a slot in the retaining block then screw collar or push collar 23 is threaded onto threaded rod 17 or is pushed onto rod 17 if the latter is notched. Retaining block 13 may be conically shaped or stepped in shape to ensure rod 17 is aligned to the center of the sink drain flange. In another embodiment, retaining block 13 is notched for installation onto rod 17. In a further embodiment, retaining block 13 and push collar 23 are integral to one another.

The apparatus may be detached from the garbage disposal unit by removing retaining block 13 and then lowering mechanism 15 via rod 17 returning wedges 14 to a contracted first position. The appparatus is then removed by holding onto the grip 18. In one embodiment, once collar 23 has been used, the apparatus cannot be used again. In one implementation, collar 23 has slots so that a user may insert a cutting device to cut rod 17 thus disengaging collar 23 so that the apparatus may then be removed from the garbage disposal unit.

Referring to FIG. 3, a standoff 26 is shown. In one embodiment, standoff 26 is coupled to rod 17. When the apparatus is ready to be secured, retaining block 13 slides on rod 17 then standoff 26 is pushed downward to contact retaining block 13. Next, collar 23 is pushed downward until engagement with standoff 23. Thus, collar 23 is in contact with standoff 26. This may be practical allowing collar 23 to be used first with standoff 26 then after removing standoff 26, a second time with retaining block 13. This extends the life of the apparatus.

In another embodiment, the apparatus may be inserted from the top of the sink instead of underneath the sink. This may be advantageous for facilitating the removal of an already installed garbage disposal unit or during the installation of a new garbage disposal. To achieve this, the apparatus with wedges 14, while in the contracted first position, is inserted through the sink drain flange and into the garbage disposal unit from the top of the sink. By pulling up on rod 17, mechanism 15 engages causing wedges 14 to extend and press against the sides of the inside of the garbage disposal grinding chamber, and thus the wedges are positioned in the expanded second position. Retaining block 13 is then secured onto rod 17 by means of the screw collar or push collar 23 which then allows the apparatus to support the weight of the garbage disposal unit. The attaching hardware of the garbage disposal unit may then be removed and the garbage disposal unit will be suspended by the apparatus. The retaining block 13 may then be removed and the apparatus and garbage disposal unit may be lowered as one unit below the sink. This is possible because as long as there is tension on rod 17, mechanism 15 is engaged and wedges 14 are lodged in the sides of the garbage disposal grinding chamber.

A similar process may be used for installing a new garbage disposal unit. Again, the apparatus with wedges 14, while in the contracted first position, is inserted through the sink drain flange and into the new garbage disposal unit from the top of the sink. By pulling up on rod 17, mechanism 15 engages causing wedges 14 to extend and press against the sides of the inside of the garbage disposal grinding chamber. The user may then lift the garbage disposal unit up to the sink and suspend the garbage disposal unit with the apparatus by securing retaining block 13 using screw collar or push collar 23, to the rod 17.

The apparatus may be made of a plastic material. In this way, the material and manufacturing costs may be inexpensive when compared to other available tools.

Figure 7:
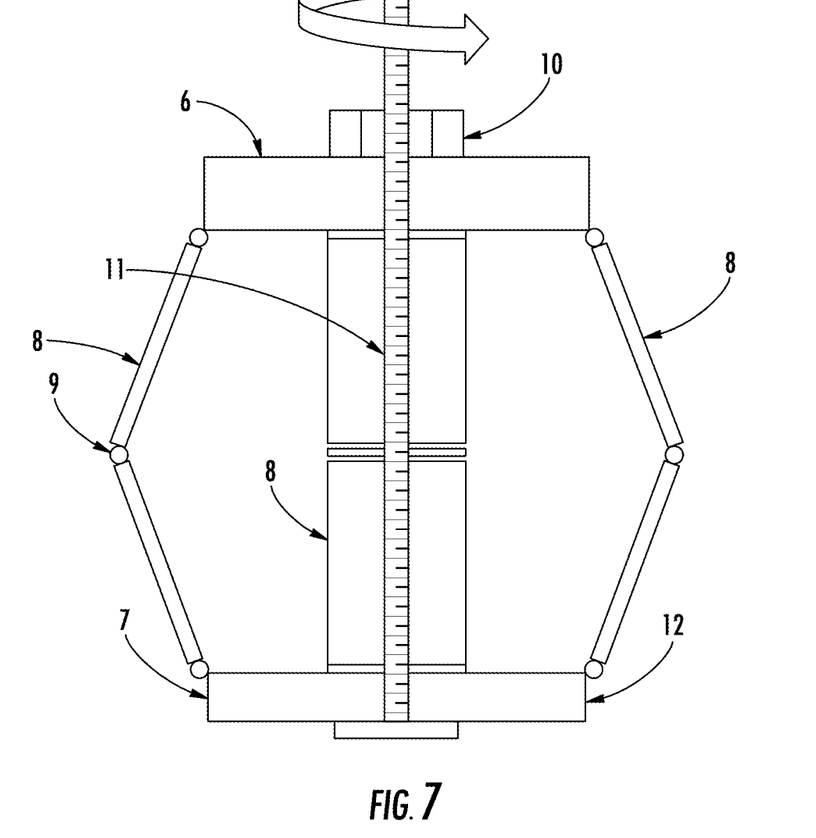
FIG. 7 illustrates an alternative embodiment of the apparatus.

FIG. 7 illustrates an alternative embodiment of the apparatus for assisting with the installation of a garbage disposal unit. The apparatus may be inserted in a garbage disposal unit, lodging itself in the internal walls of the garbage disposal grinding chamber, allowing the garbage disposal unit to be hoisted and aligned with the sink. It consists of a rod 11, an upper plate 6, a lower plate 7, two or more wedges 8 and a nut 10. Wedges 8 may be in an uncompressed first position in one mode of operation, or in a compressed second position in a second mode of operation.

Rod 11 may be threaded therefore using a nut for attachment. In another embodiment, rod 11 may be notched. The notches are engaged by a ratcheting device on rod 11. Rod 11 may be constructed of a metal, plastic or composite material.

Upper plate 6 and lower plate 7 are coupled together via two or more articulated wedges 8. Upper plate 6 and a lower plate 7 may be of a circular shape and can be brought closer together by rotating rod 11. Nut 10 secures the assembly on rod 11. In one embodiment, rod 11 is threaded so that by rotating rod 11, wedges 8 are forced into the compressed second position. In another embodiment, rod 11 has notches so that by engaging the notches such as by a ratcheting device on rod 11, wedges 8 are forced into the compressed second position.

Figure 8:
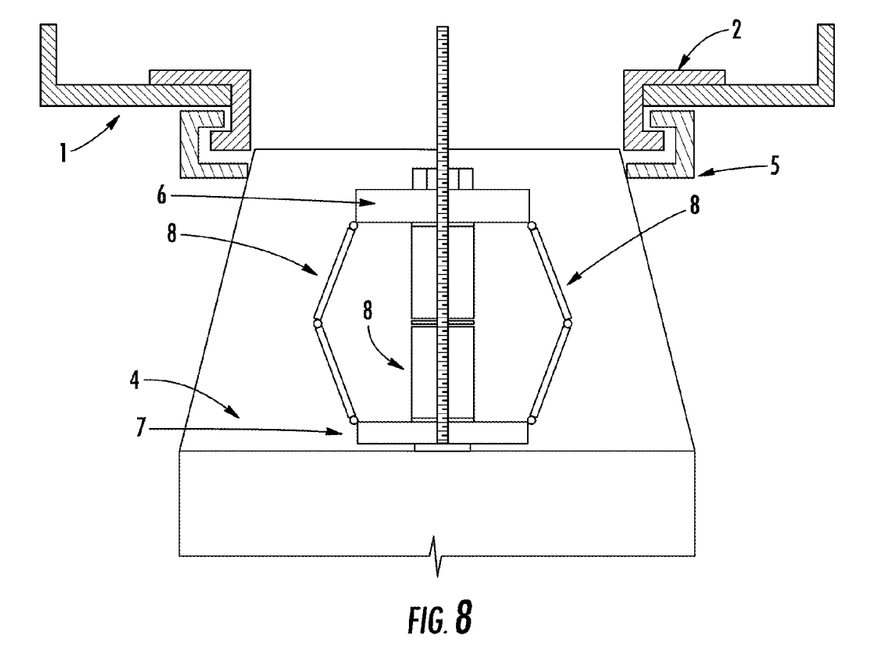
FIG. 8 shows an example embodiment of the apparatus in uncompressed mode inserted in the grinding chamber of the garbage disposal unit.

When wedges 8 are in an uncompressed first position, the apparatus is narrow enough to be inserted into the grinding chamber 4 of the garbage disposal unit as shown in FIG. 8. The grinding chambers may come in many different shapes, although the opening to the grinding chamber is standardized to allow the interchange of the variety of garbage disposal units and sinks available in the marketplace.

Figure 9:
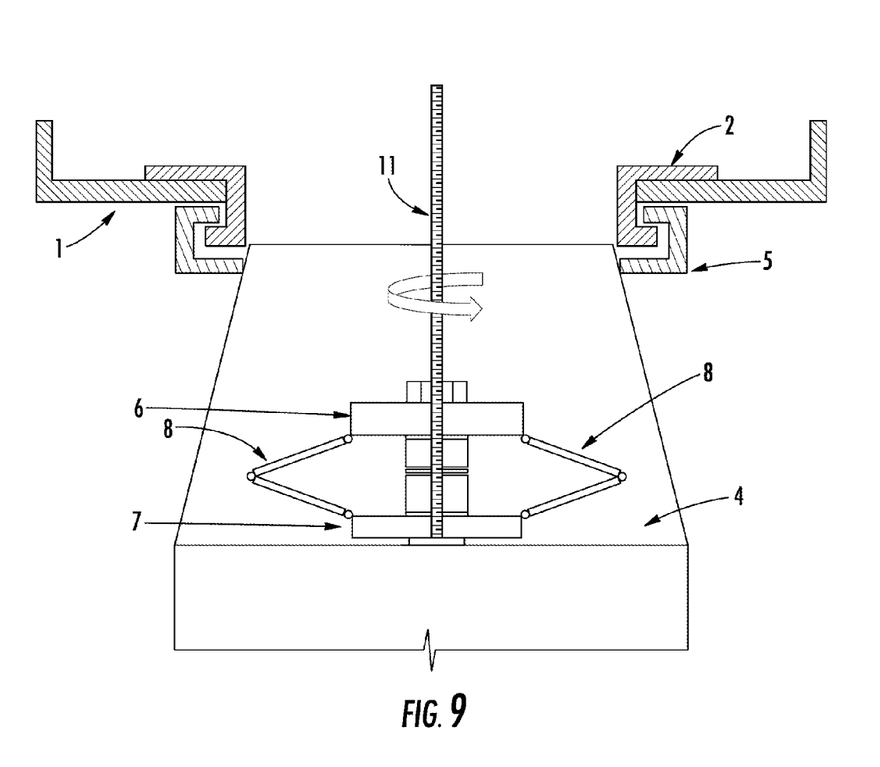
FIG. 9 is an example embodiment of the apparatus in compressed mode inserted in the grinding chamber of the garbage disposal unit.

Referring to FIG. 9, as upper and lower plates are brought closer together, wedges 8 are forced outward and lodge against the internal walls of the garbage disposal grinding chamber. At this point, the garbage disposal unit may then be lifted via rod 11.

Figure 10:
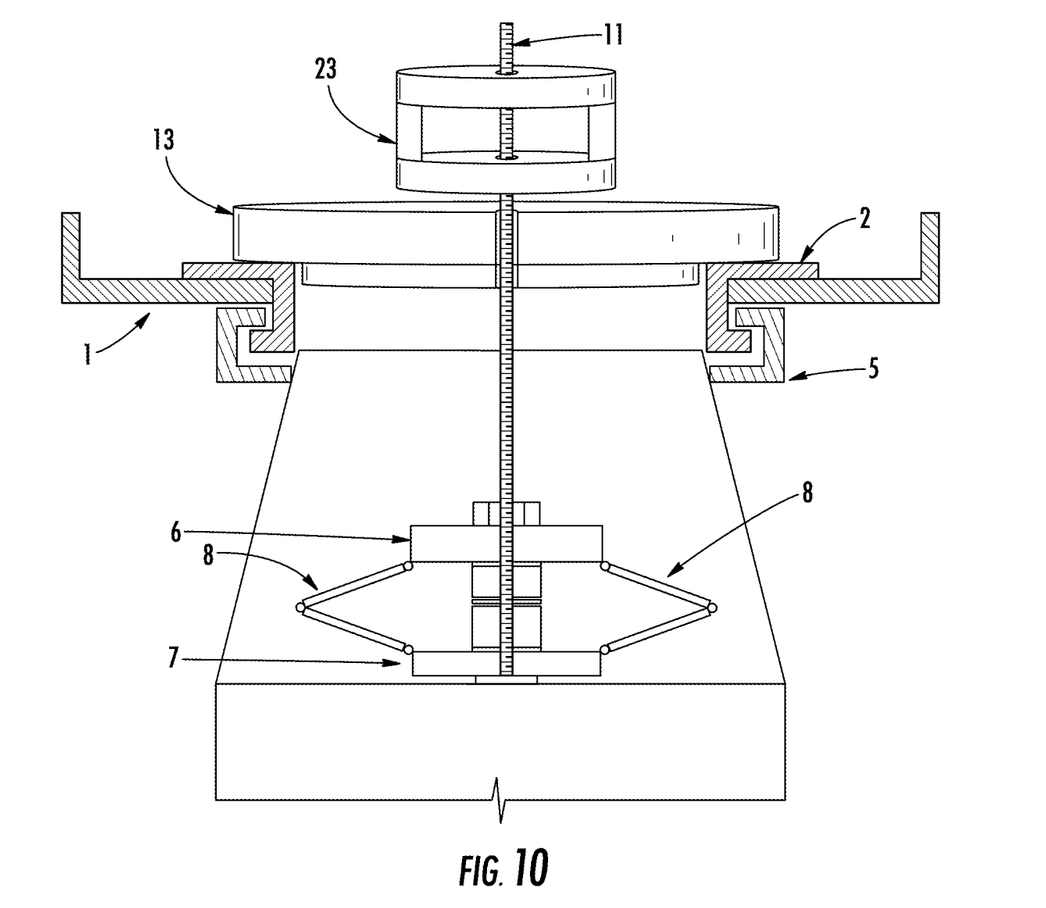
FIG. 10 shows the garbage disposal unit suspended from the sink in one embodiment.

Rod 11 may then be inserted from the underside of the sink through the sink drain flange 2, and the entire garbage disposal unit can be suspended from the sink then secured. In one embodiment, a retaining block 13 and a screw collar or push collar 23 are fastened on rod 11 as shown in FIG. 10. Retaining block 13 slides onto the rod through a slot in the retaining block then screw collar or push collar 23 is threaded onto threaded rod 11 or is pushed onto rod 17 if the latter is notched. Retaining block 13 may be conically shaped or stepped in shape to ensure rod 11 is aligned to the center of the sink drain flange 2. In another embodiment, retaining block 13 is notched for installation onto rod 11. In a further embodiment, retaining block 13 and push collar 23 are integral to one another. Here, the apparatus lifts and holds the garbage disposal unit into position for locking ring 5 engagement.

While the garbage disposal unit is suspended from the sink, the single user may freely go under the sink and fasten the attaching hardware such as a locking ring or compression screws, thus securing the garbage disposal unit to the correct position, without having to physically hold the garbage disposal in place.

Once the garbage disposal unit is secured in the correct position, rod 11 may be rotated in the opposite direction (if threaded) or disengaged (if notched) thus allowing the removal of the apparatus from the garbage disposal unit by uncompressing wedges 8.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the invention. Thus, it is intended that the present subject matter covers such modifications and variations.

The invention claimed is:

1. An apparatus for assisting with installation or removal of a garbage disposal unit, the apparatus comprising:
   a rod;
   mechanism coupled to the rod and having a curved surface;
   a plate, the plate moveably coupled to the rod;
   multiple wedges, the wedges pivotally coupled to the plate;
   wherein when the mechanism is engaged, (i) the wedges move from a contracted first position to an expanded second position and (ii) the curved surface engages the wedges; and
   wherein when the wedges are in the expanded second position, the wedges are capable of engaging with inside side walls of a garbage disposal unit to transfer a weight of the garbage disposal unit onto the mechanism and the rod.

2. The apparatus of claim 1, wherein the rod is positioned vertically.

3. The apparatus of claim 1, wherein the plate moves vertically along the rod.

4. The apparatus of claim 1, wherein the mechanism holds the wedges in place in the expanded second position.

5. The apparatus of claim 1, wherein the wedges are conically shaped.

6. The apparatus of claim 1, wherein the mechanism is an oval or hemispherical ball.

7. The apparatus of claim 1, wherein the rod and mechanism are made of a plastic material.

8. The apparatus of claim 1, wherein the mechanism is integral with the rod.

9. The apparatus of claim 1, wherein the rod has notches which engage to secure the wedges in the expanded second position.

10. A method for assisting with the installation or removal of a garbage disposal unit, the method comprising:
    inserting an apparatus in a contracted first position through a drain flange in a sink, the apparatus including a rod, a retaining block, a collar, a plate, multiple wedges and a mechanism;
    securing the retaining block onto the rod by means of the collar;
    engaging the mechanism, the mechanism being coupled to the rod and having a curved surface;
    moving the wedges from the contracted first position to an expanded second position, (i) the wedges pivotally being coupled to the plate and (ii) the curved surface engaging the wedges;
    engaging the wedges with inside side walls of the garbage disposal unit; and
    holding the wedges in the expanded second position by means of the plate, the plate moveably coupled to the rod;
    wherein a weight of the garbage disposal unit is transferred onto the mechanism and the rod when the wedges are in the expanded second position.

11. The apparatus of claim 10, wherein the rod is positioned vertically.

12. The apparatus of claim 10, wherein the plate moves vertically along the rod.

13. The method of claim 10, wherein the wedges are conically shaped.

14. The method of claim 10, wherein the mechanism is an oval or hemispherical ball.

15. The method of claim 10, wherein the mechanism is integral with the rod.

16. The method of claim 10, wherein the apparatus is inserted from an underside of the sink.

17. The method of claim 10, wherein the apparatus is inserted from the top of the sink.

18. An apparatus for assisting with installation or removal of a garbage disposal unit, the apparatus comprising:
    a non-threaded rod;
    a mechanism coupled to the rod;
    a plate, the plate moveably coupled to the rod;
    multiple wedges, the wedges pivotally coupled to the plate;
    wherein when the mechanism is engaged, the wedges move from a contracted first position to an expanded second position; and
    wherein when the wedges are in the expanded second position, the wedges are capable of engaging with inside side walls of a garbage disposal unit to transfer a weight of the garbage disposal unit onto the mechanism and the rod.

* * * * *